UNITED STATES PATENT OFFICE.

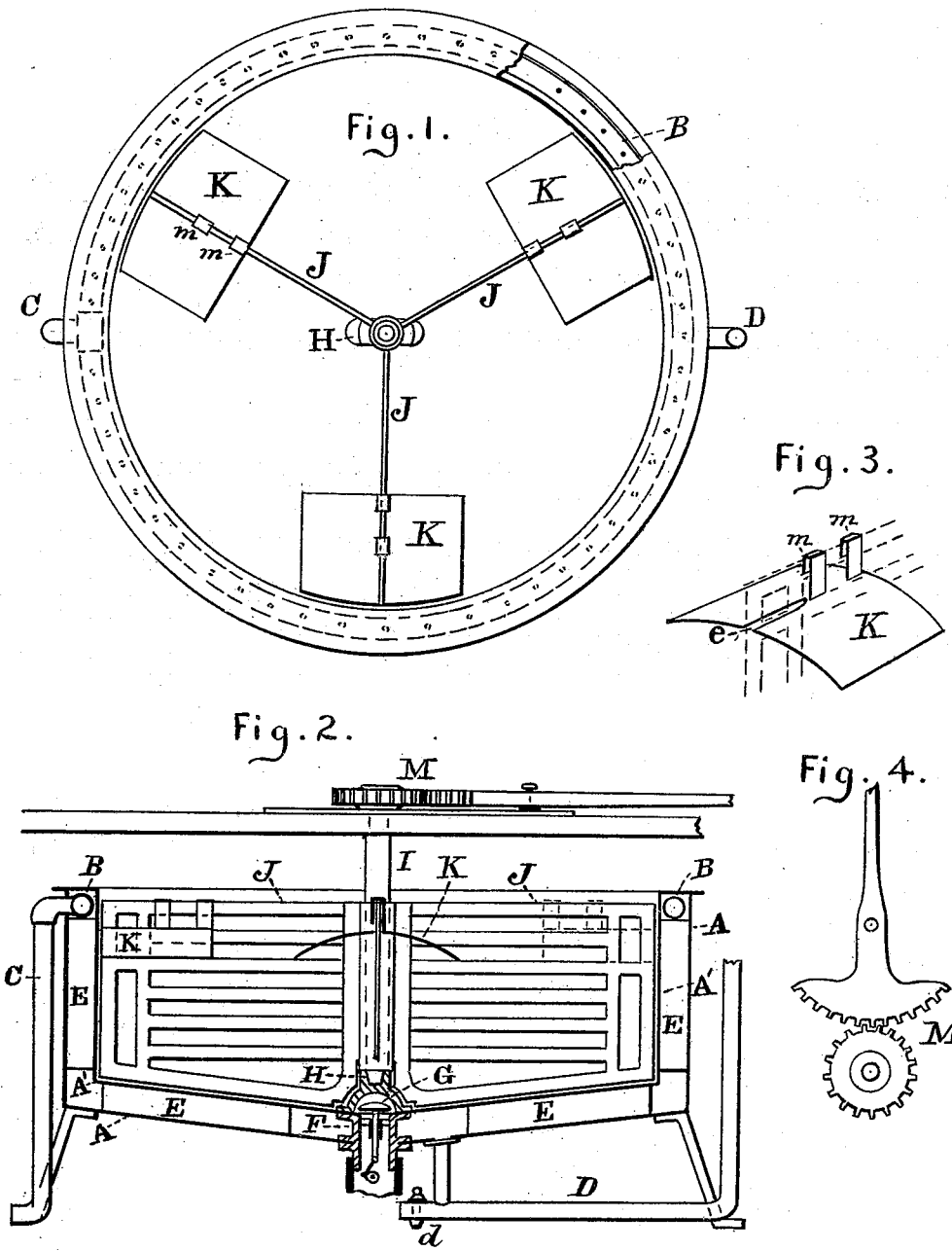

CHARLES MEISTER, OF BALTIMORE, MARYLAND.

IMPROVEMENT IN LARD-COOLERS.

Specification forming part of Letters Patent No. 179,809, dated July 11, 1876; application filed April 6, 1876.

*To all whom it may concern:*

Be it known that I, CHARLES MEISTER, of the city of Baltimore, in the State of Maryland, have invented certain new and useful Improvements in Coolers and Mixers for Lard and other liquids; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention relates to devices for mixing and cooling lard and other articles, to which my device is adaptable; and consists in certain improvements in the construction of the same, as hereinafter shown and described.

In the accompanying drawing, forming a part of this specification, Figure 1 is a plan view of the tank and mixer. Fig. 2 is a vertical section. Fig. 3 illustrates the guards placed on the mixer. Fig. 4 represents an attachment, through which the shaft of the mixer is operated.

In my construction the tank or receptacle for the lard, or other article to be cooled and mixed, is made circular, and has an outer and an inner casing, with space for water between them. The bottom of the tank is made somewhat concave or lowest at the point where the nozzle is located, through which the lard is drawn out. The said outer and inner casings have strips or braces placed between them to sustain them in their relative positions. The water-space is filled by means of a pipe entering at the bottom of the tank, and is discharged by means of a perforated pipe extending around through the water-space at or near the top—another pipe conducting the water from the perforated pipe. A flanged nozzle is fixed in the bottom of the tank, at the center, or at the lowest point thereof, for the purpose of drawing out the lard, said nozzle having a valve in it to regulate the flow. A mixer to be revolved within the tank is placed upon an upright shaft, and is preferably made three pronged, or of three sets of radial bars extending outward from the shaft, the latter resting in a step-pan immediately over the nozzle. The step-pan, however, may be dispensed with in construction, and the mixer may be connected to a hanging shaft having a suitable support and bearing above the tank. Each prong or series of radial bars of the mixer is provided with a detachable and adjustable guard, as shown in the drawing, to prevent the lard or liquid splashing out when the mixer is in motion.

For further description reference is made to the drawing, in which A and A' designate the outer and the inner casings of the tank, the space for water being between them, and the strips or braces E between the casings serving to sustain them in their relative positions. Within the water-space at or near the top of the tank is placed a perforated pipe, B, which extends entirely around between the outer and inner casings, and has an outlet-pipe, C, leading from it, as shown. The water-chamber is filled with cold water by means of the water-pipe D, which communicates with the chamber at the bottom of the tank, said pipe D being provided with a cock or valve at *d*, by which the flow of water into the chamber may be regulated, and through which the water in the chamber may be withdrawn. A flanged nozzle, F, is fixed in the center of the bottom of the tank, or at the lowest point in the bottom, said nozzle being provided with a valve, G. A pipe may be connected with the nozzle below for conducting the lard from the tank to barrels or packing-cases. Over the nozzle F is fixed a step-pan, H, in which the upright revolving shaft I of the mixer rests. This step-pan is constructed so as to allow the lard to pass through the nozzle F below. The mixer on the shaft I is formed of stirrers J, preferably three in number, extending radially from the shaft I, each having a set of horizontal bars, as shown. Each stirrer has also an edge, which extends closely to the side and bottom of the tank, and prevents the lard or liquid from congealing, thus effectually stirring and mixing the entire contents. A guard, K, is provided for each of the stirrers J, said guard being somewhat curved, and extending from both sides of the stirrer, to which it is removably coupled at the center, as shown in the drawing, Fig. 3. Each of the guards K is formed with a slot, *e*, and provided with coupling-hooks *m*, and the guard is attached to the stirrer J by passing it between two of the horizontal bars, to one of which it is hooked, and then closed to the upright parts at the outer extremity of the stirrer, as indicated in Fig. 3. The said guard K, being detachable, is readily removed and attached to either of the horizontal bars of the stirrer, according to the depth of the liquid in the tank. The purpose of these guards is to prevent uprising or splashing out of the liquid while the mixer is in motion.

The movement of the mixer is rotary reciprocating, and it may be operated by hand or other power by means of a toothed wheel and segment shown in Fig. 4, and marked M, said toothed wheel being attached to the mixer-shaft at its upper end.

In the operation of the construction described, the cold water, as shown, is inducted into the water-chamber at the bottom, and being gathered by the perforated pipe B, is discharged from the top through the outlet-pipe C. The water-chamber extends entirely around and underneath the receptacle for the lard, and as the water becomes gradually heated it naturally rises to the perforated pipe B, and is thus discharged as it becomes warm. The mixer, having the radial stirrers J, provided with adjustable guards K, and conforming to the interior of the tank, brings every part of the contents rapidly in contact with the cooling-surfaces by its alternate movement.

Having described my invention, I claim—

1. The circular tank, having the casings A and A', forming the water-chamber, and provided with the perforated pipe B, the pipe C, and pipe D, constructed as shown, for the purposes described.

2. In the mixing apparatus the stirrers J in combination with the adjustable guards K, constructed as shown, for the purpose set forth.

In testimony that I claim the foregoing as my own I affix my signature in presence of two witnesses.

CHARLES MEISTER.

Witnesses:
CHARLES JOHN SCHILLER,
H. ANTHON DANIELS.